(12) United States Patent
Itoh

(10) Patent No.: US 7,016,596 B2
(45) Date of Patent: Mar. 21, 2006

(54) IMAGE PROCESSING APPARATUS, IMAGE PROCESSING METHOD, RECORDING MEDIUM AND DATA SIGNAL PROVIDING IMAGE PROCESSING PROGRAM

(75) Inventor: Masaharu Itoh, Tokyo (JP)

(73) Assignee: Nikon Corporation, Tokyo (JP)

( * ) Notice: Subject to any disclaimer, the term of this patent is extended or adjusted under 35 U.S.C. 154(b) by 911 days.

(21) Appl. No.: 09/829,949

(22) Filed: Apr. 11, 2001

(65) Prior Publication Data

US 2002/0041753 A1 Apr. 11, 2002

Related U.S. Application Data

(63) Continuation-in-part of application No. 09/449,943, filed on Nov. 29, 1999.

(30) Foreign Application Priority Data

Nov. 30, 1998 (JP) .................................. 10-338747
Apr. 12, 2000 (JP) ............................... 2000-110121

(51) Int. Cl.
*H04N 5/91* (2006.01)
*G11B 27/00* (2006.01)
(52) U.S. Cl. ........................... 386/46; 386/117; 386/52
(58) Field of Classification Search .................. 386/46, 386/52, 55, 68, 67, 69, 70, 81, 82, 107, 117, 386/1, 4, 6, 38
See application file for complete search history.

(56) References Cited

U.S. PATENT DOCUMENTS

| | | | |
|---|---|---|---|
| 4,945,424 A | 7/1990 | Hiroki et al. | |
| 5,404,316 A | 4/1995 | Klingler et al. | |
| 5,477,337 A | 12/1995 | Schuler | |
| 5,513,306 A | 4/1996 | Mills et al. | |
| 5,903,309 A | 5/1999 | Anderson | |
| 2002/0186958 A1* | 12/2002 | Ikeda et al. | 386/69 |
| 2004/0128317 A1* | 7/2004 | Sull et al. | 707/104.1 |

* cited by examiner

Primary Examiner—Robert Chevalier
(74) Attorney, Agent, or Firm—Oliff & Berridge, PLC

(57) ABSTRACT

An image processing apparatus that reads out and outputs image information recorded in a recording medium, includes: a read device that reads out a plurality of sets of image information recorded in the recording medium; a display device that displays image information read out by the read device; a selection device through which any image information among the image information displayed at the display device can be freely selected; an output device that outputs image information selected by the selection device; and a control device that implements control to ensure that image information read out by the read device is not provided to the display device while image information is being output by the output device.

9 Claims, 12 Drawing Sheets

FIG. 8
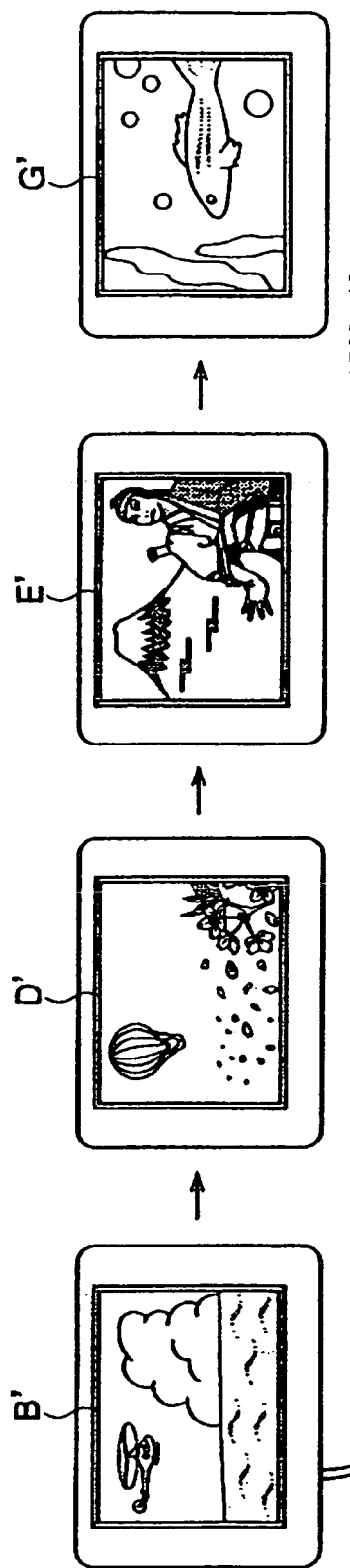
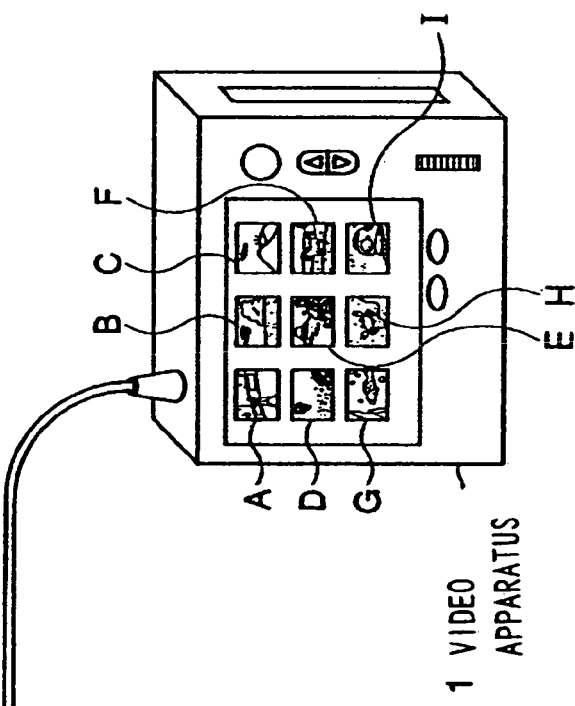

IMAGE PROCESSING APPARATUS, IMAGE PROCESSING METHOD, RECORDING MEDIUM AND DATA SIGNAL PROVIDING IMAGE PROCESSING PROGRAM

This application is a continuation in part of U.S. patent application Ser. No. 09/449,943 filed Nov. 29, 1999.

INCORPORATION BY REFERENCE

The disclosures of the following priority application are herein incorporated by reference:
Japanese Patent Application No. 10-338747 filed Nov. 30, 1998
Japanese Patent Application No. 2000-110121 filed Apr. 12, 2000
U.S. patent application Ser. No. 09/449,943 filed Nov. 29, 1999

BACKGROUND OF THE INVENTION

1. Field of the Invention

The present invention relates to an image processing apparatus, an image processing method, a recording medium and a data signal, and more specifically, it relates to an image processing apparatus and an image processing method that make it possible to verify a dynamic image to be reproduced, to select a dynamic image to be reproduced next and to specify the order in which dynamic images are reproduced by implementing control to ensure that no image information is provided to a display unit of the image processing apparatus while the image information is being output to an external display apparatus, and a recording medium and a data signal that provide an image processing program.

2. Description of the Related Art

A video apparatus provided with an image display unit in the prior art assumes a structure that allows a dynamic image to be displayed at the image displayed unit of the video apparatus while the same dynamic image is being output to an external image display apparatus. In addition, a time counter or an operating state may be displayed superimposed on the dynamic image displayed at the image display unit of the video apparatus.

However, the video apparatus in the prior art described above presents a problem in that dynamic images to be output to the external image display apparatus cannot be verified at a glance, the dynamic image to be reproduced next cannot be verified or a dynamic image to be reproduced cannot be selected while a dynamic image is being output to the external display apparatus, necessitating the next operation to be started only after the reproduction of dynamic image is completed at the external image display apparatus.

SUMMARY OF THE INVENTION

An object of the present invention is to provide an image processing apparatus that makes it possible to verify a dynamic image that is currently being reproduced, to select a dynamic image to be reproduced next and to specify the order in which dynamic images are reproduced at the side of the image processing apparatus while reproducing the current dynamic image at an external image display apparatus. Another object of the present invention is to provide an image processing method employed by the image processing apparatus and a recording medium and a data signal that provide such an image processing program.

An image processing apparatus according to the present invention that reads out and outputs image information recorded in a recording medium, comprises: a read device that reads out a plurality of sets of image information recorded in the recording medium; a display device that displays image information read out by the read device; a selection device through which any image information among the image information displayed at the display device can be freely selected; an output device that outputs image information selected by the selection device; and a control device that implements control to ensure that image information read out by the read device is not provided to the display device while image information is being output by the output device.

It is preferred that this image processing apparatus further comprises: an image-capturing device that captures an image of a subject; and a recording device that records image information with respect to the image captured by the image-capturing device in the recording medium. It is preferred that this image processing apparatus furthermore comprises: a switching device that selects either the image information with respect to the image captured by the image-capturing device or the image information read out from the recording medium for display at the display device.

In the above image processing apparatus, it is preferred that the image information recorded in the recording medium is dynamic image information; and a generating device that generates still image information to be displayed at the display device based upon the dynamic image information recorded in the recording medium is further provided.

It is also preferred that the image information output by the output device is dynamic image information; and the display device displays the dynamic image information currently output by the output device.

An image processing method according to the present invention employed in an image processing apparatus that reads out and outputs image information recorded in an image information recording medium, comprises: a read out step in which a plurality of sets of image information recorded in the image information recording medium are read out; a display step in which the image information read out in the read out step is displayed; a selection step in which any given set of image information is selected from the image information displayed in the display step; an output step in which the image information selected in the selection step is output; and a control step in which control is implemented to ensure that the image information read out in the read out step is not provided to the display step while an output of image information is in progress in the output step.

A recording medium according to the present invention have recorded therein a program used in an image processing apparatus that reads out and outputs image information recorded in an image information recording medium. The program comprises: a read out step in which a plurality of sets of image information recorded in the image information recording medium are read out; a display step in which the image information read out in the read out step is displayed; a selection step in which any given set of image information is selected from the image information displayed in the display step; an output step in which the image information selected in the selection step is output; and a control step in which control is implemented to ensure that the image information read out in the read out step is not provided to the display step while an output of image information is in progress in the output step.

A data signal according to the present invention embodied in a carrier wave comprises a program used in an image processing apparatus that reads out and outputs image information recorded in an image information recording medium. The program comprises: a read out step in which a plurality of sets of image information recorded in the image information recording medium are read out; a display step in which the image information read out in the read out step is displayed; a selection step in which any given set of image information is selected from the image information displayed in the display step; an output step in which the image information selected in the selection step is output; and a control step in which control is implemented to ensure that the image information read out in the read out step is not provided to the display step while an output of image information is in progress in the output step.

BRIEF DESCRIPTION OF THE DRAWINGS

FIG. 8 also illustrates the relationship between the display images at the video apparatus and the video monitor 40 in FIG. 1.

DESCRIPTION OF THE PREFERRED EMBODIMENT

First Embodiment

Figure 1:
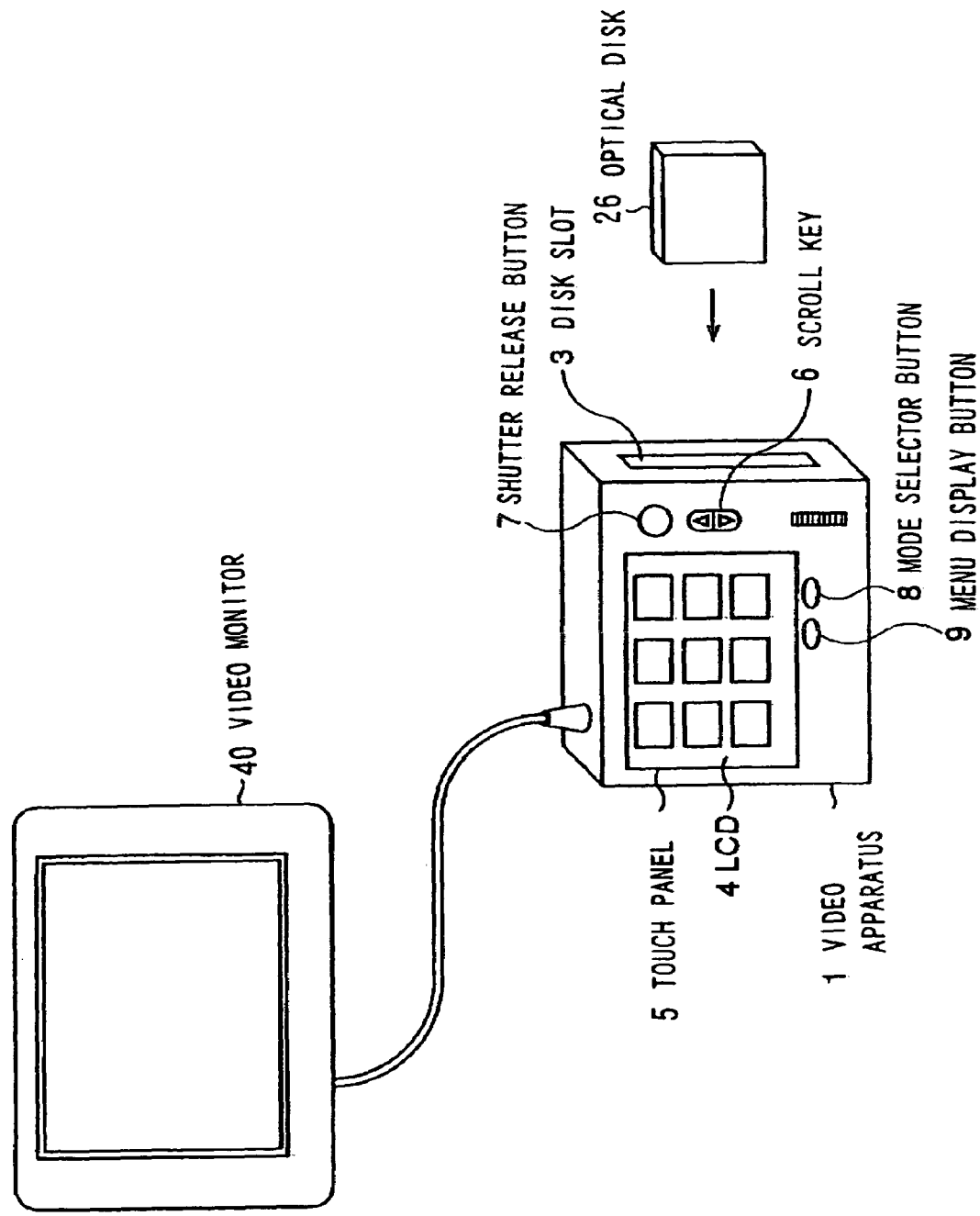
FIG. 1 presents an external view of a video apparatus adopting the present invention.

Before explaining a specific embodiment of the present invention, an overview of the present invention is explained in reference to the drawings.

An image processing apparatus that reads out and outputs image information recorded in a recording medium, comprises: a read device (for example an image processing unit 24 in FIG. 2) that reads out a plurality of sets of image information recorded in the recording medium; a display device (for example an image display unit 4 in FIG. 2) that displays image information read out by the read device; a selection device (for example an image controller 28 in FIG. 2) through which any image information among the image information displayed at the display device can be freely selected; an output device (for example an external image output terminal 32 in FIG. 2) that outputs image information selected by the selection device; and a control device (for example a controller 28 in FIG. 2) that implements control to ensure that image information read out by the read device is not provided to the display device while image information is being output by the output device.

This image processing apparatus further comprises: an image-capturing device (for example an image-capturing unit 23 in FIG. 2) that captures an image of a subject; and a recording device (for example a recording unit 25 in FIG. 2) that records image information with respect to the image captured by the image-capturing device in the recording medium. The image processing apparatus furthermore comprises: a switching device (for example an image controller 28 in FIG. 2) that selects either the image information with respect to the image captured by the image-capturing device or the image information read out from the recording medium for display at the display device.

Also in the above image processing apparatus: the image information recorded in the recording medium is dynamic image information; and a generating device (for example an MPU 21 in FIG. 2) that generates still image information to be displayed at the display device based upon the dynamic image information recorded in the recording medium is further provided.

Also in the above image processing apparatus: the image information output by the output device (for example the external image output terminal 32 in FIG. 2) is dynamic image information; and the display device (for example the image display unit 4 in FIG. 2) displays the dynamic image information currently output by the output device.

Next, a specific embodiment of the present invention is explained.

FIG. 1 presents a schematic external view of a video apparatus 1 adopting the present invention. At the front of the video apparatus 1, an image-capturing unit (not shown) is provided. In addition, a disk slot 3, where an optical disk 26 constituting a recording medium which allows random access is inserted, is provided at a side surface of the video apparatus 1. At the rear of the video apparatus 1, a liquid crystal display (LCD) 4 is provided. A touch panel 5 is adhered onto the LCD 4. The touch panel 5, which is constituted of a conductive transparent film, allows touch operation. A scroll key 6 is provided to scroll images displayed on the LCD 4.

Figure 2:
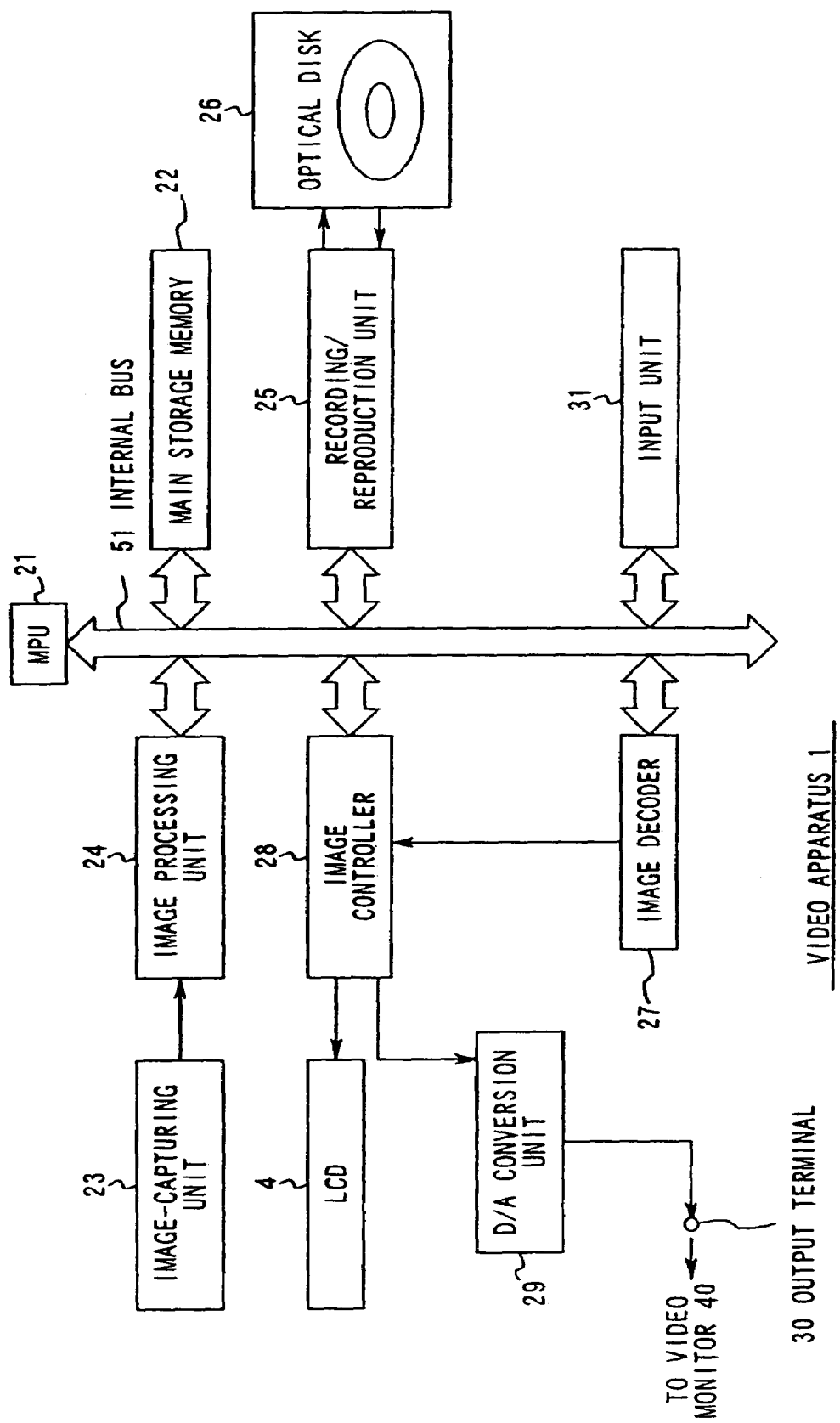
FIG. 2 is a block diagram illustrating a structural example of the video apparatus in FIG. 1.

FIG. 2 is a block diagram presenting a structural example of the video apparatus 1 in FIG. 1. An MPU (Micro Processing Unit) 21, which includes a ROM (Read Only Memory) (not shown) for storing a system program, engages in data processing and output control. A main storage memory 22 is constituted of a semiconductor memory that stores a program and data transferred by the MPU 21.

An image processing unit 24 first digitizes dynamic image data that represent a dynamic image captured by an image-capturing unit 23 and then compresses the digitized data.

An exchangeable optical disk 26 can be loaded at a recording unit 25. The recording unit 25 records dynamic image data that are provided to it in the optical disk 26 in a recording mode, and reproduces dynamic image data recorded in the optical disk 26 in a reproduction mode. It is to be noted that the recording unit 25 records dynamic image data which are provided to it if no optical disk 26 is loaded.

An image decoder 27 decodes image data provided to it and outputs decoded data to an image controller 28.

The image controller 28 is provided with a contact 28A and a contact 28B to switch the output destination for the image data provided to it. The image controller 28 outputs the image data to a D/A conversion unit 29 when the contact 28A is in an off state and the contact 28B is in an on state. In addition, the image controller 28 outputs the image data to an image display unit (LCD 4) when the contact 28A is in an on state and the contact 28B is in an off state. It is to be noted that the contact 28A and the contact 28B are electronically switched.

The D/A conversion unit 29 converts digital image data to analog image data, and outputs the analog data to a video monitor 40 via an external image output terminal 32.

A selection menu screen that displays a plurality of sets of image data provided by the image controller 28 is brought up on the image display unit 4. The plurality of images displayed on the selection menu screen represent thumbnail image data prepared from dynamic image data. Thumbnail image data are prepared by reducing the leading image in each of a plurality of sets of dynamic image data. The touch panel 5, which functions as an instruction input unit, is provided on the surface of the image display unit 4, so that when the user touches a given image on the selection menu screen through the touch panel 5, information indicating that the image touched by the user has been selected is provided to the MPU 21 via an internal bus 100.

Figure 3:
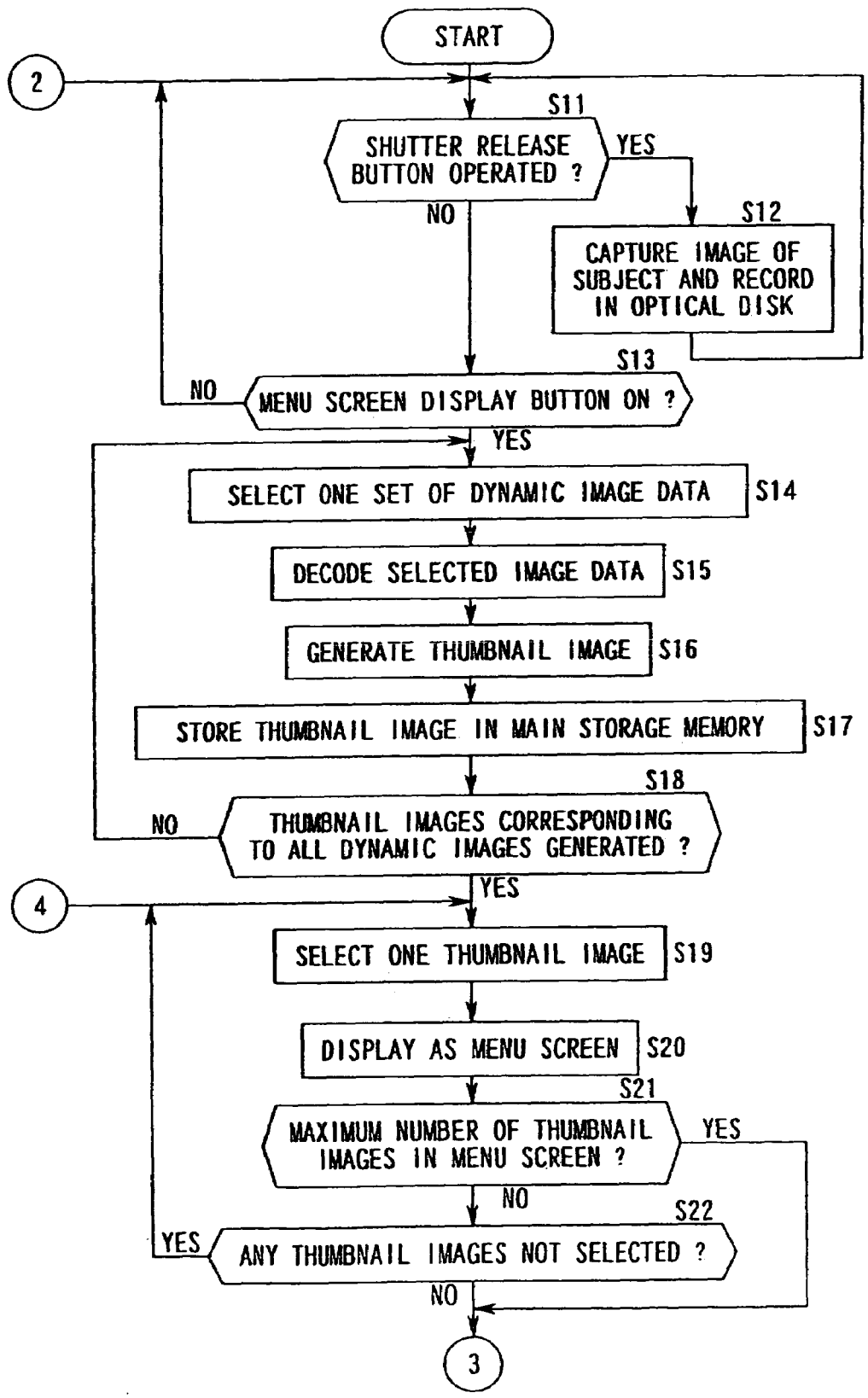
FIG. 3 is a flowchart of an operation performed by the video apparatus in FIG. 1.
Figure 4:
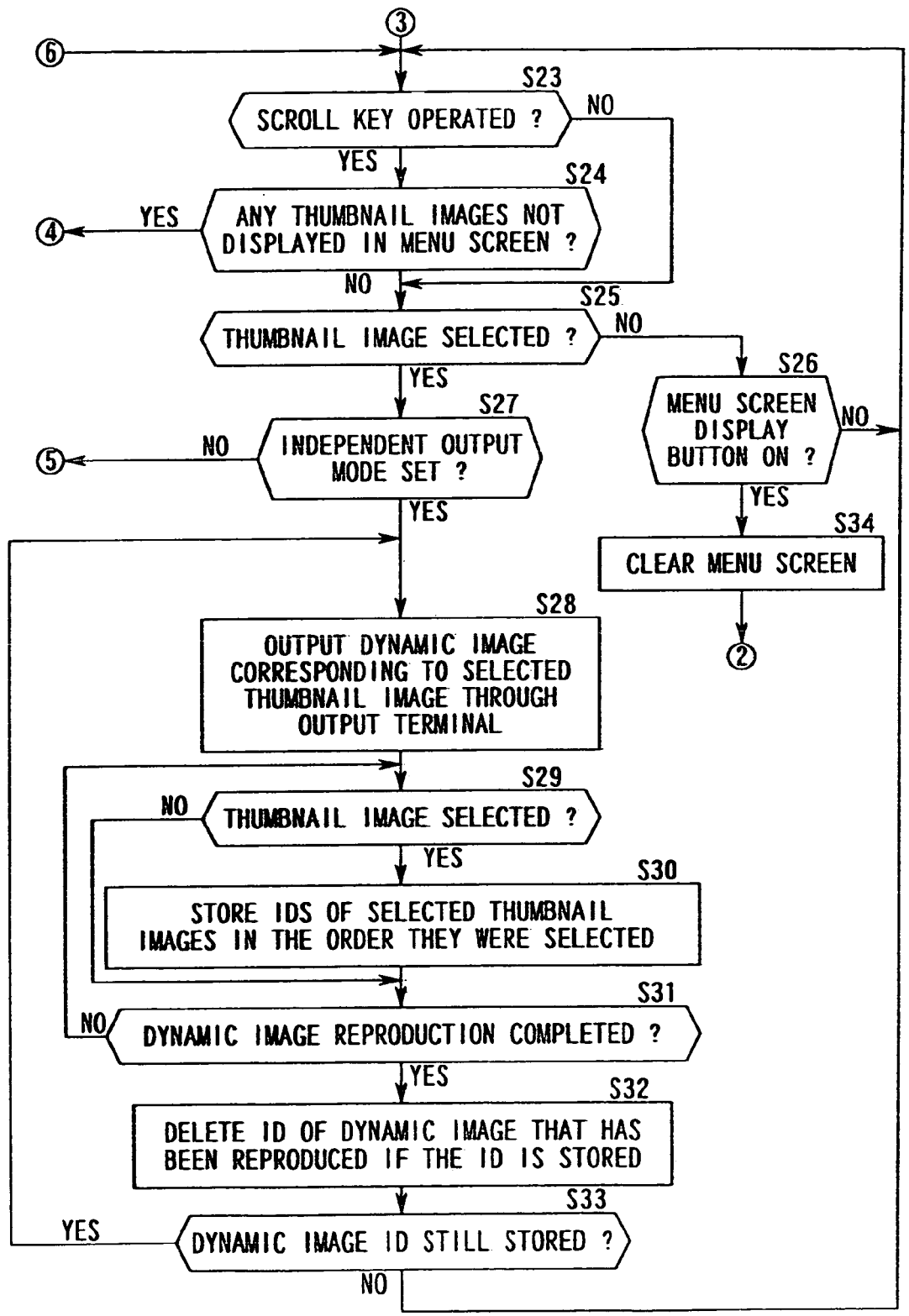
FIG. 4 is another flowchart of an operation performed by the video apparatus in FIG. 1.
Figure 5:
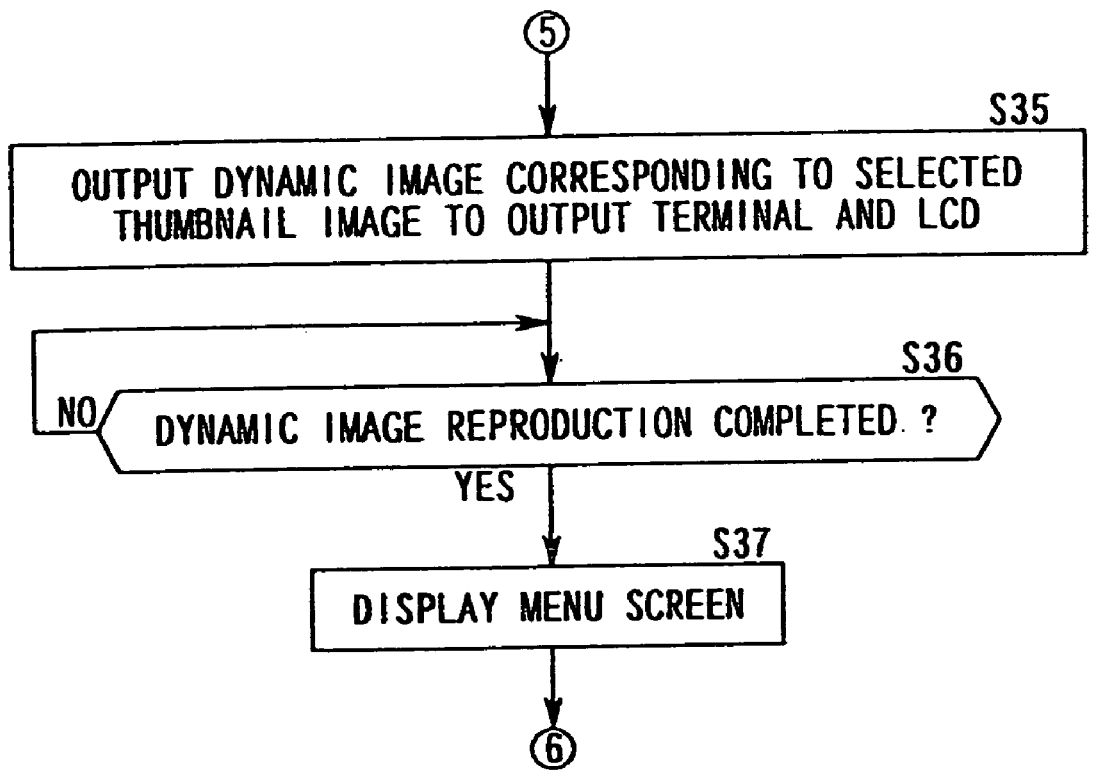
FIG. 5 is another flowchart of an operation performed by the video apparatus in FIG. 1.

Next, the operation performed by the video apparatus 1 in FIG. 1 is explained in reference to the flowcharts in FIGS. 3 through 5. In step S11, the MPU 21 makes a decision as to whether or not a dynamic image has been captured at the image-capturing unit 23. The MPU 21 remains in step S11 in a standby state until a dynamic image is captured, and when it is decided that a dynamic image has been captured, it proceeds to step S12.

In step S12, the image-capturing unit 23 outputs dynamic image data representing the captured dynamic image to the image processing unit 24.

In step S13, the image processing unit 24 performs digital conversion processing and data compression processing on the dynamic image data that have been provided.

In step S14, the MPU 21 provides the dynamic image data having undergone the digital conversion processing and the data compression processing to the recording unit 25 via the internal bus 100.

In step S15, the recording unit 25 records the dynamic image data, which have been provided, in the optical disk 26.

In step S16, the MPU 21 reads out a plurality of sets of dynamic image data recorded in the optical disk 26 to the main storage memory 22, and using the dynamic image data thus read out, it creates a plurality of sets of thumbnail image data.

In step S17, the MPU 21 provides the thumbnail image data thus prepared to the image decoder 27 via the internal bus 100.

In step S18, the image decoder 27 decodes the thumbnail image data that have been provided and outputs the decoded data to the image controller 28.

In step S19, the MPU 21 implements control on the image controller 28 to turn on the contact 28A and turn off the contact 28B at the image controller 28. The thumbnail image data provided to the image controller 28 are output to the image display unit 4.

Figure 6:
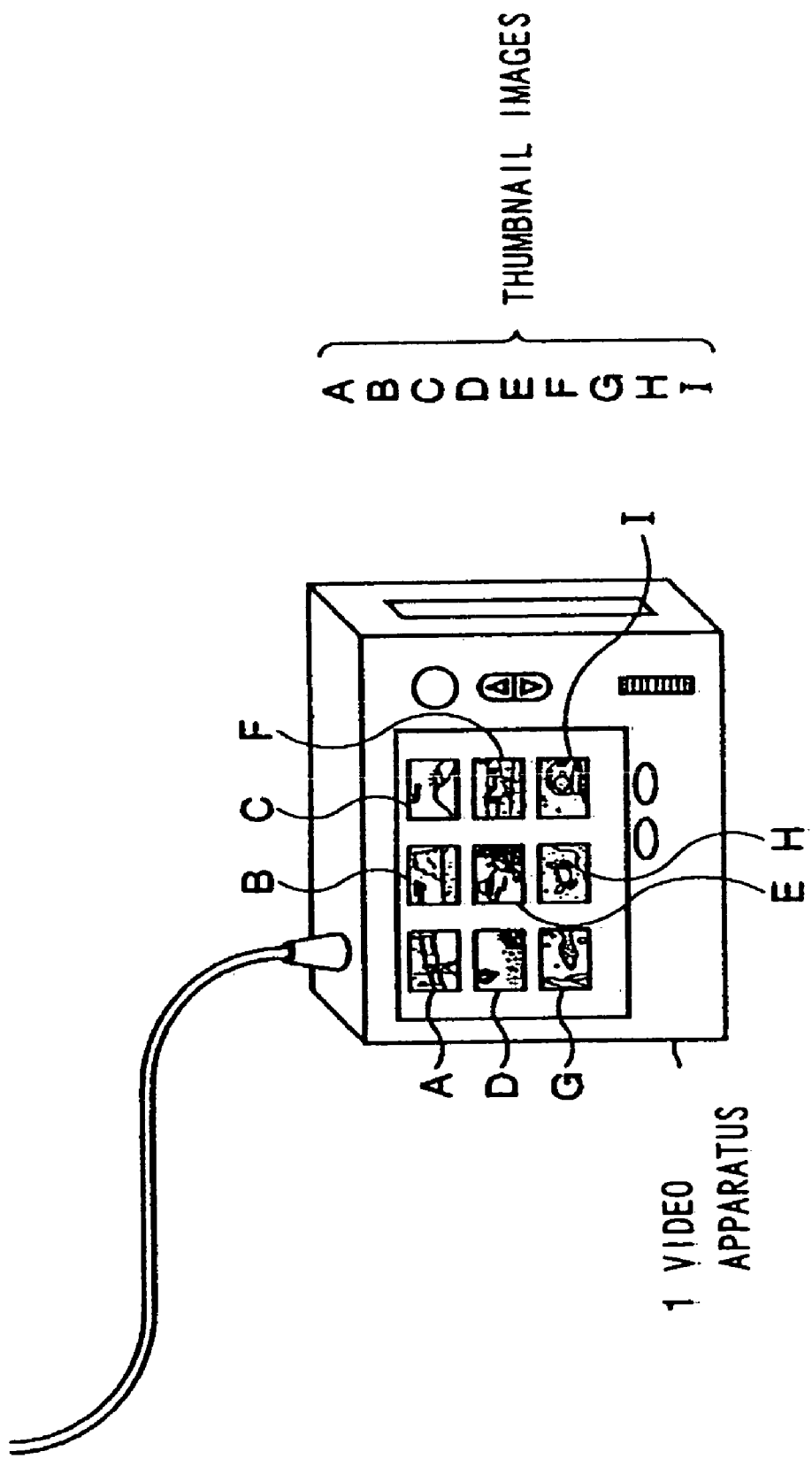
FIG. 6 illustrates the selection menu screen brought up on the LCD 4 in FIG. 1.

In step S20, the image display unit 4 displays the thumbnail image data that have been provided. A plurality of thumbnail images are displayed as a selection menu screen at the image display unit 4. For instance, as illustrated in FIG. 6, thumbnail images A, B, C, D, E, F, G, H and I among a plurality of thumbnail images corresponding to a plurality of sets of thumbnail image data are displayed as a selection menu screen. It is to be noted that by using the scroll key 6, the display can be scrolled to quickly display of all the thumbnail images corresponding to the dynamic image data recorded in the optical disk 26. When the processing in step S20 is completed, the operation proceeds to step S101 in FIG. 4.

In step S101, the MPU 21 makes a decision as to whether or not any of the plurality of thumbnail images displayed in the selection menu screen on the image display unit 4 has been selected through the touch panel 5. If it is decided by the MPU 21 in step S101 that no thumbnail image has been selected, the operation proceeds to step S211 in FIG. 5. The processing performed in step S211 and in subsequent steps is to be detailed later.

If the MPU 21 decides in step S101 that a thumbnail image selection has been made, a decision is made by the MPU 21 in step S102 as to whether one thumbnail image or a plurality of thumbnail images has been selected. If it is decided that one thumbnail image has been selected, the operation proceeds to step S103, whereas if it is decided that one thumbnail image has not been selected, i.e., if it is decided that a plurality of thumbnail images have been selected, the operation proceeds to step S111. The processing performed in step S111 and in subsequent steps is to be detailed later.

Figure 7:
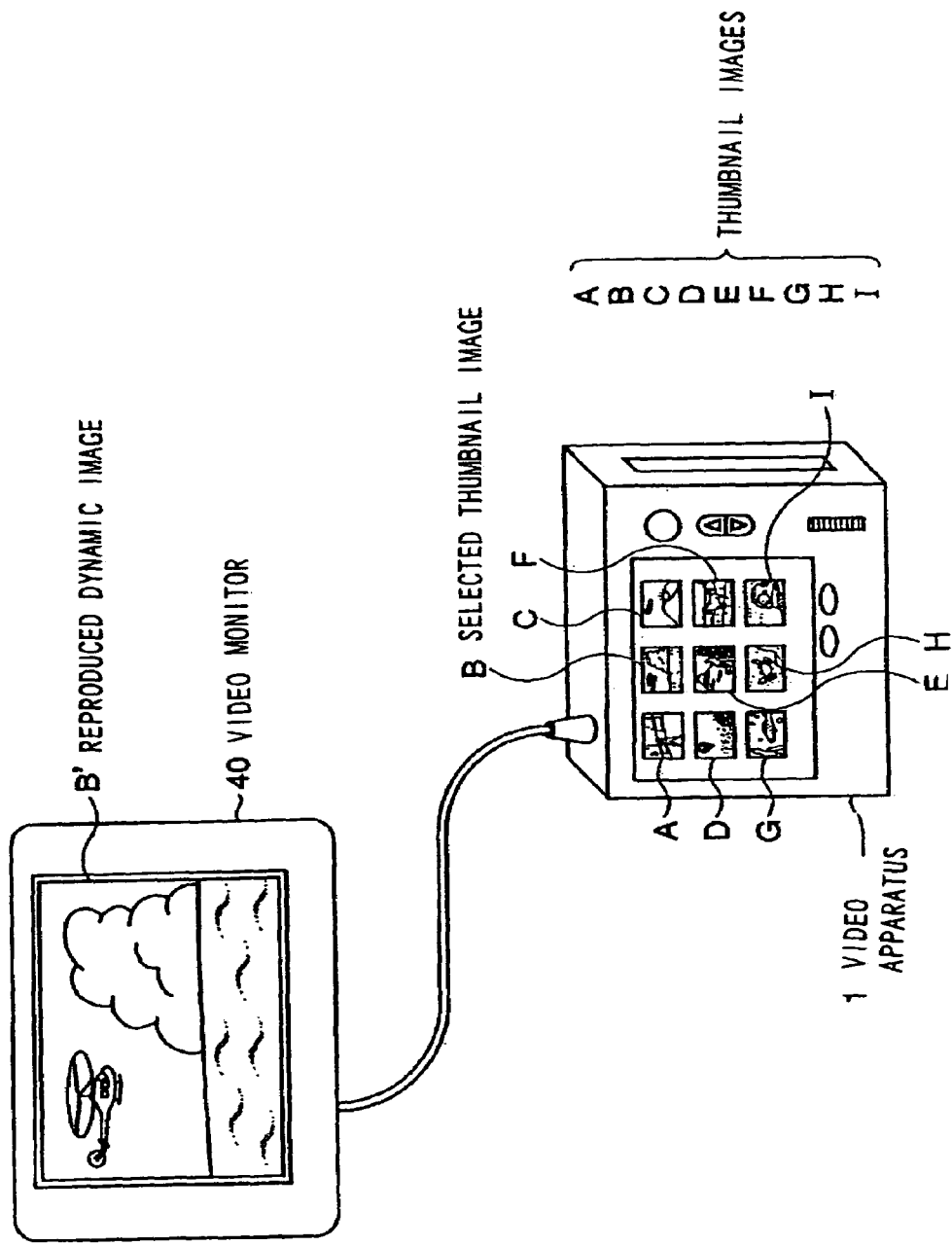
FIG. 7 illustrates the relationship between the display images at the video apparatus and the video monitor 40 in FIG. 1.

In step S103, the MPU 21 makes a decision as to which one of the plurality of thumbnail images has been selected. For instance, it may be decided that the thumbnail image B has been selected from the selection menu screen on the image display unit 4, as illustrated in FIG. 7.

In step S104, the MPU 21 provides the dynamic image data corresponding to the thumbnail image B that are temporarily stored in the main storage memory 22 to the image decoder 27 via the internal bus 100.

In step S105, the image decoder 27 decodes the dynamic image data that have been provided and outputs the decoded data to the image controller 28.

In step S106, the MPU 21 implements control on the contact 28A and the contact 28B of the image controller 28 to set the contact 28A in an off state and the contact 28B in an on state while the dynamic image data are being provided. The dynamic image data are provided to the D/A conversion unit 29 via the image controller 28.

In step S107, the D/A conversion unit 29 converts the digital dynamic image data that have been provided to analog data.

In step S108, the D/A conversion unit 29 outputs the analog dynamic image data resulting from the conversion to the video monitor 40 via the external image output terminal 32. The video monitor 40 reproduces the dynamic image data thus provided. For instance, the video monitor 40 may reproduce a dynamic image B' corresponding to the thumbnail image B that has been provided, as illustrated in FIG. 7. When the processing in step S108 is completed, the operation returns to step S101 to execute the subsequent processing.

In addition, if it is decided in step S102 that a plurality of thumbnail images have been selected as mentioned earlier, the MPU 21 makes a decision in step S111 as to which thumbnail images have been selected and what order the thumbnail images have been selected in. For instance, the MPU 21 may decide that thumbnail images have been selected in the order of B, D, E and G as illustrated in FIG. 8.

In step S112, the MPU 21 rearranges the order in which dynamic image data are stored in the main storage memory 22 in conformance to information that indicates the order in which the thumbnail images have been selected.

Then, the operation proceeds to step S104 to engage in the processing that continues through step S109 as explained earlier. Namely, in step S104, the MPU 21 provides the dynamic image data in the rearranged order to the image decoder 27 via the internal bus 100.

In step S105, the image decoder 27 decodes the dynamic image data that have been provided in the order they were provided and outputs the decoded dynamic image data to the image controller 28.

In step S106, the MPU 21 implements control of the image controller 28 to set the contact 28A in an off state and the contact 28B in an on state while the dynamic image data are being provided. The dynamic image data are provided to the D/A conversion unit 29 via the image controller 28.

In step S107, the D/A conversion unit 29 converts the digital dynamic image data thus provided to analog data.

In step S108, the D/A conversion unit 29 outputs the analog dynamic image data resulting from the conversion to the video monitor 40 via the external image output terminal 32. The video monitor 40 reproduces images in the order in which they have been provided, i.e., in the order of dynamic images B', D', E'and G' corresponding to the thumbnail images B, D, E and G. When the processing in step S108 is completed, the operation returns to step S101 to execute the subsequent processing.

If it is decided by the MPU 21 in step S101 that no thumbnail image has been selected, as mentioned earlier, the MPU 21 makes a decision in step S211 in FIG. 5 as to whether or not a new dynamic image has been captured at the image-capturing unit 23. If the MPU 21 decides that no new dynamic image has been captured, the operation returns to step S101, whereas if it is decided that a new dynamic image has been captured, the operation proceeds to step S212.

In step S212, the image-capturing unit 23 outputs dynamic image data representing the new dynamic image that has been captured to the image processing unit 24.

In step S213, the image processing unit 24 performs digital conversion processing and data compression processing on the dynamic image data thus provided.

In step S214, the MPU 21 provides the dynamic image data having undergone digital conversion processing and data compression processing to the recording unit 25 via the internal bus 100.

In step S215, the recording unit 25 records the dynamic image data that have been provided in the optical disk 26.

In step S216, the MPU 21 reads out a plurality of sets of dynamic image data recorded in the optical disk 26 to the main storage memory 22 and creates a plurality of sets of thumbnail image data from the dynamic image data thus read out.

In step S217, the MPU 21 provides the thumbnail image data that have been created to the image decoder 27 via the internal bus 100.

In step S218, the image decoder 27 decodes the thumbnail image data that have been provided and outputs the decoded data to the image controller 28.

In step S219, the MPU 21 implements control of the image controller 28 to set the contact 28A in an on state and the contact 28B in an off state at the image controller 28. The thumbnail image data provided to the image controller 28 are then provided to the image display unit 4.

In step S220, the image display unit displays the thumbnail image data that have been provided. At the image display unit 4, the plurality of thumbnail images are displayed as a selection menu screen. When the processing in step S220 is completed, the operation returns to step S101 to execute the subsequent processing.

As explained above, in the video apparatus 2 in FIG. 1, control is implemented on the image controller 28 to set the contact 28A in an on state and the contact 28B in an off state while dynamic image data are being output to the video monitor 40 to ensure that the dynamic image data are not output to the video monitor 40 and, as a result, dynamic images that can be reproduced at the video monitor 40 can be verified at a glance, a dynamic image to be reproduced at the video monitor 40 can be selected and the order in which dynamic images are to be reproduced can be selected, while reproduction of a dynamic image is in progress at the video monitor 40.

Figure 10A:
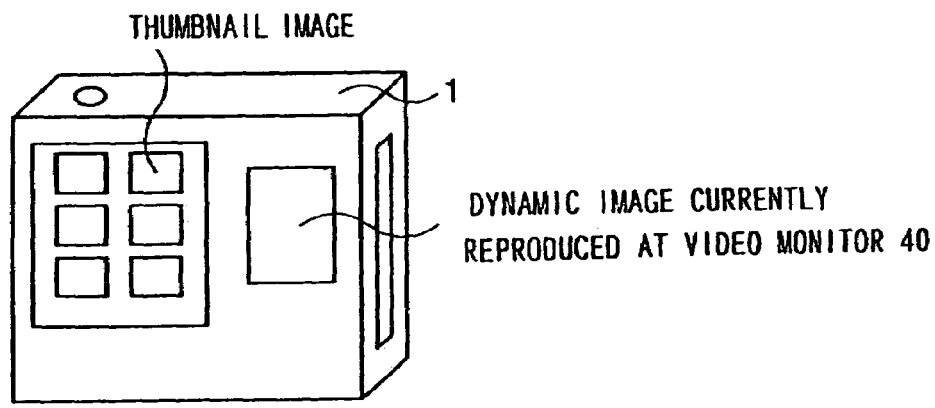
FIGS. 10A~10C illustrate other selection menu screens brought up on the LCD 4 in FIG. 1.

While a plurality of thumbnail images are only displayed as the selection menu screen at the image display unit 4 in the example explained above, the dynamic image that is currently being reproduced at the video monitor 40 may be also displayed at the image display unit 4, as shown in FIG. 10A, so that the contents of the dynamic image currently reproduced at the video monitor 40 can be verified at all times.

Figure 10B:
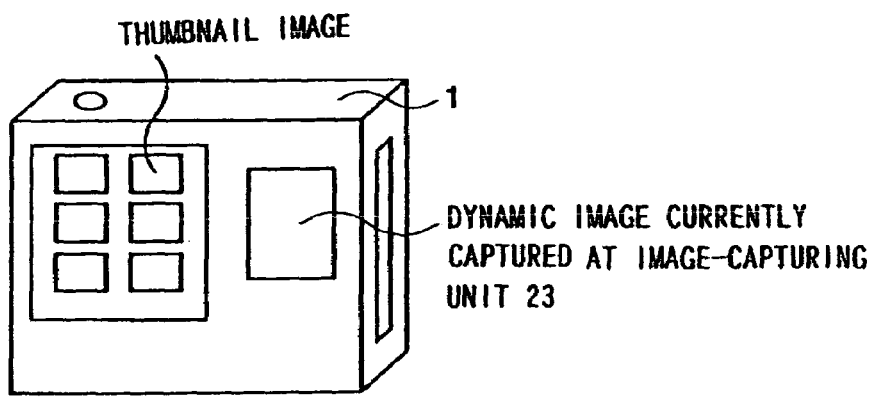

Alternatively, as illustrated in FIG. 10B, the dynamic image currently captured at the image-capturing unit 23 may be displayed together with the plurality of thumbnail images at the image display unit 4, to make it possible to verify the dynamic image currently captured at the image-capturing unit 23.

Figure 10C:
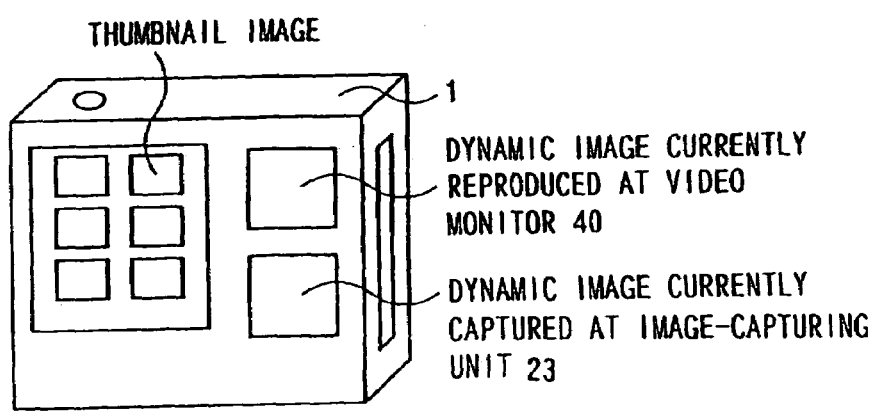

Furthermore, as illustrated in FIG. 10C, the dynamic image currently reproduced at the video monitor 40 and the dynamic image currently captured at the image-capturing unit 23 may be displayed together with the plurality of thumbnail images at the image display unit 4 instead, so that the contents of the dynamic image currently reproduced at the video monitor 40 and the dynamic image currently captured at the image-capturing unit 23 can both be verified.

Figure 11A:
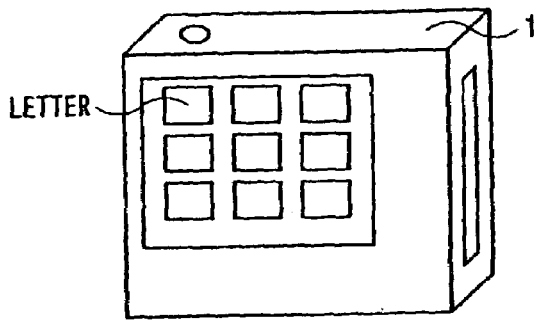
FIGS. 11A~11D illustrate other selection menu screens brought up on the LCD 4 in FIG. 1.
Figure 11B:
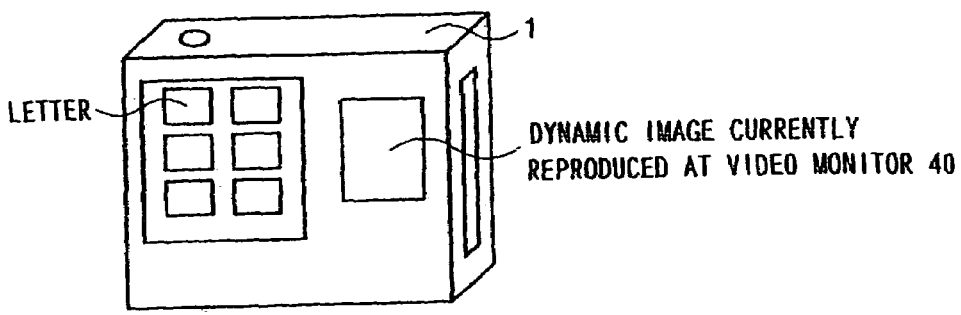
Figure 11C:
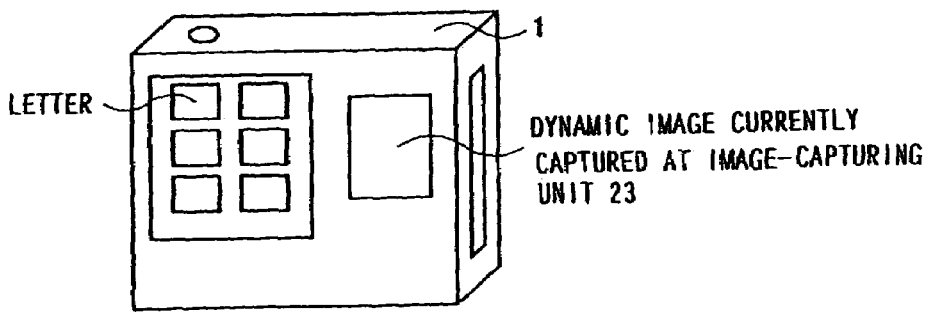
Figure 11D:
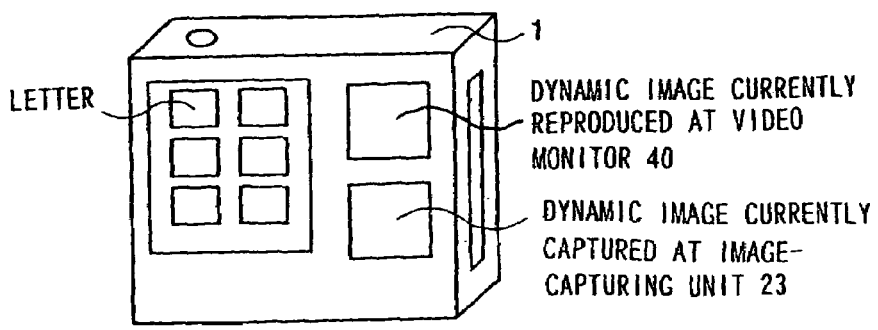

Moreover, as illustrated in FIG. 11A, images of letters or the like that represent characteristics of dynamic images recorded in the optical disk 26 may be displayed in place of thumbnail images. In addition, in combination with images of letters or the like representing the characteristics of the dynamic images, the dynamic image currently reproduced at the video monitor 40 may be displayed as illustrated in FIG. 11B, the dynamic image currently captured at the image-capturing unit 23 may be displayed as illustrated in FIG. 11C or both the dynamic image currently reproduced at the video monitor 40 and the dynamic image currently captured at the image-capturing unit 23 may be displayed, as illustrated in FIG. 11D.

Furthermore, instead of a plurality of thumbnail images, a plurality of dynamic images that are recorded in the optical disk 26 may be directly displayed. In combination with those dynamic images, the dynamic image currently reproduced at the video monitor 40, the dynamic image currently captured at the image-capturing unit 23, or both the dynamic image currently reproduced at the video monitor 40 and the dynamic image currently captured at the image-capturing unit 23 may be displayed. Details of these displays may be illustrated in figures achieved by replacing the letter images in FIGS. 11A~11D with dynamic images.

In addition, while dynamic images captured at the image-capturing unit 23 are recorded in the optical disk 26 and the dynamic image thus recorded are reproduced in the video apparatus 1 in FIG. 1, the video apparatus 1 may be utilized as a reproduction apparatus which is not provided with the image-capturing unit 23, to reproduce images recorded in the optical disk 26 in advance through some type of processing.

Furthermore, instead of the electronic contacts 28A and 28B, mechanical contacts may be used at the image controller 28.

Moreover, while the optical disk 26 is employed as the recording medium, a magnetic disk, a semiconductor disk or the like may be utilized as the recording medium instead. Also, the instruction input unit may be constituted of a mouse or the like instead of the touch panel 5. The image display unit 4 may be constituted of a CRT (Cathode Ray Tube) instead of the LCD 4.

It is to be noted that while the explanation is given above on an example in which the program for executing the processing described above is stored in a ROM (not shown), the ROM may be replaced by a memory that allows an overwrite so that the program can be provided through the optical disk 26. In addition, the program may be provided in any of other types of recording media including a magnetic disk, a CD ROM and a solid memory, or it may be provided by utilizing a communication medium such as a network or a satellite. Specific examples in which a communication medium is utilized include the Internet, personal computer network service and mobile telephone.

Figure 12:
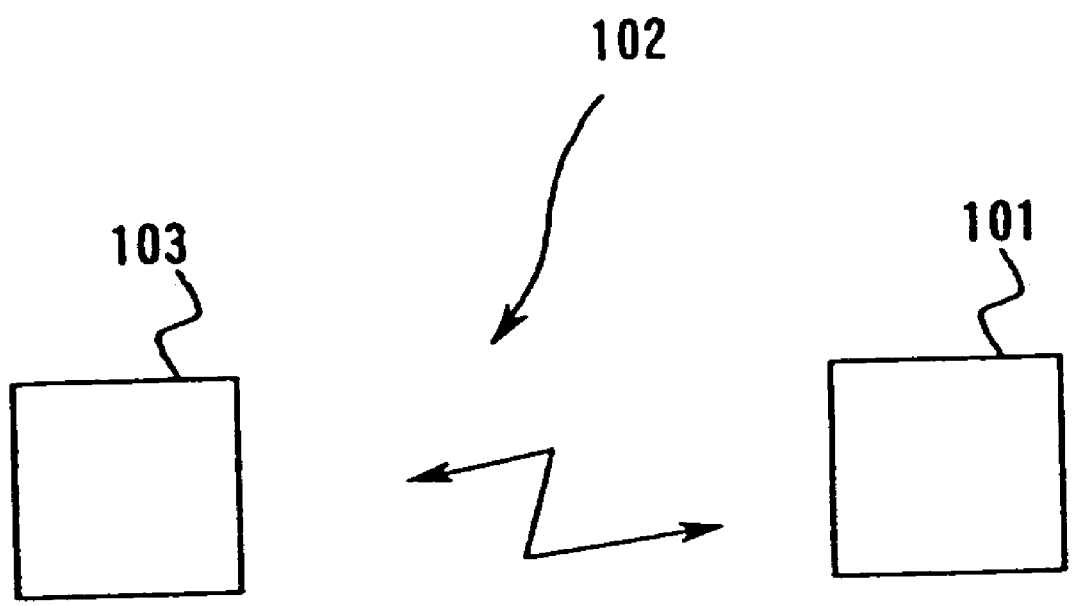
FIG. 12 illustrates how a program may be provided through a telecommunication line.

FIG. 12 illustrates an example in which such a communication medium is utilized. A video apparatus 101, which corresponds to the video apparatus 1 explained above, executes the processing detailed earlier. The video apparatus 101 has a function of connecting with a telecommunication line 102. A computer 103 is a server computer having the processing program stored therein and provides the processing program. The telecommunication line 102 may be a telecommunication line for connecting to the Internet, a personal computer network service or the like, or it may be a dedicated telecommunication line. Examples of the telecommunication line 102 include a telephone line and a wireless telephone line such as a mobile telephone line. Thus, the program can be converted to a signal embodied in a carrier wave that carries a transmission medium to be transmitted.

Second Embodiment

The second embodiment will be explained by using figures identical to those of the first embodiment.

FIG. 1 presents a schematic external view of a video apparatus 1 adopting the present invention. At the front of the video apparatus 1, an image-capturing unit 23 (see FIG. 2) is provided. In addition, a disk slot 3, where an optical disk 26 constituting a recording medium which allows random access is inserted, is provided at a side surface of the video apparatus 1. At the rear of the video apparatus 1, a liquid crystal display (LCD) 4 is provided. A touch panel 5 is adhered on the LCD 4. The touch panel 5 having electrodes constituted of a transparent material allows the user to visually check the image on the LCD 4 and detects a region of pressure under the finger of the user. A scroll key 6 is provided to scroll the image displayed on the LCD 4. A shutter release button 7 is operated to capture an image. A mode selector button 8 is operated to set or clear an exclusive output mode. A menu display button 9 is operated to display a menu screen on the LCD 4 or to clear a menu screen currently displayed on LCD 4. In addition, a video monitor 40 is connected to the video apparatus 1 in this example.

FIG. 2 is a block diagram presenting an example of an internal structure that may be adopted in the video apparatus 1 in FIG. 1. An MPU (Micro Processing Unit) 21, which includes a ROM (Read Only Memory) (not shown) for storing a system program, processes data and controls various units via an internal bus 51. A main storage memory 22 is constituted of a semiconductor memory that stores a program and data transferred by the MPU 21. An image processing unit 24 first digitizes an image signal output from the image-capturing unit 23 and then compresses the digitized signal.

An exchangeable optical disk 26 can be loaded at a recording/reproduction unit 25. The recording/reproduction unit 25 records dynamic image data that are provided to it in the optical disk 26 in a recording mode, and reproduces dynamic image data recorded in the optical disk 26 in a reproduction mode.

An image decoder 27 decodes (decompresses) image data provided to it and outputs the decoded data to an image controller 28. The image controller 28 provides the image data thus received to a D/A conversion unit 29 or the LCD 4.

The D/A conversion unit 29 converts digital image data to analog image data, and outputs the analog data via an output terminal 30 to a video monitor 40 connected to the output terminal 30.

An input unit 31 is constituted of the touch panel 5, the scroll key 6, the shutter release button 7, the mode selector button 8, the menu display button 9 and the like.

Next, the operation performed by the video apparatus 1 in FIG. 1 is explained in reference to the flowcharts in FIGS. 3 through 5. In step S11, the MPU 21 makes a decision as to whether or not the shutter release button 7 has been operated. If it is decided that the shutter release button 7 has been operated, the MPU 21 engages the image-capturing unit 23 to capture an image of the subject and has the corresponding dynamic image data recorded into the optical disk 26 in step S12 before the operation returns to step S11.

Namely, in step S12, the image-capturing unit 23 captures an image of the subject and outputs the corresponding dynamic image signal to the image processing unit 24. The image processing unit 24 converts the dynamic image signal thus provided to digital data and encodes the digital data in a predetermined format (e.g., JPEG). The MPU 21 then outputs the encoded dynamic image data to the recording/reproduction unit 25 via the internal bus 51. The recording/reproduction unit 25 records the supplied dynamic image data in the optical disk 26. The dynamic image data obtained through the image-capturing operation performed by the image-capturing unit 23 are thus recorded in the optical disk 26.

If it is decided in step S11 that the shutter release button 7 has not been operated, the MPU 21 makes a decision in step S13 as to whether or not the menu display button 9 has been turned on. If it is decided that the menu display button 9 has not been turned on, the operation returns to step S11 to repeat the subsequent processing.

If it is decided in step S13 that the menu display button 9 has been turned on, the operation proceeds to step S14 in which the MPU 21 selects one set of dynamic image data from the dynamic image data recorded in the optical disk 26. Then, in step S15, the MPU 21 provides the selected dynamic image data to the image decoder 27 where they become decoded. Next, in step S16, the MPU 21 creates thumbnail image data by using the decoded dynamic image data. In step S17, the MPU 21 has the thumbnail image data thus created recorded in the main storage memory 22.

In step S18, the MPU 21 makes a decision as to whether or not thumbnail image data have been created in correspondence to all the dynamic image data stored in the optical disk 26. If it is decided that thumbnail image data corresponding to all the dynamic image data have not been created yet, the operation returns to step S14, and the processing in steps S14 through S18 is executed repeatedly until it is decided that the creation of the entire thumbnail image data has been completed.

If it is decided in step S18 that the thumbnail image data corresponding to all the dynamics image data have been created, the operation proceeds to step S19 in which the MPU 21 selects one set of thumbnail image data from the thumbnail image data stored in the main storage memory 22. Then, the MPU 21 displays the selected thumbnail image at the LCD 4 in step S20. Namely, the thumbnail image data selected in step S19 are output to the image controller 28 via the internal bus 51. The MPU 21 implements control the image controller 28 to output the thumbnail image data supplied to the image controller 28 to the LCD 4. The supplied thumbnail image is then displayed on the LCD 4. Thus, a thumbnail image A stored in the main storage memory 22 is displayed as one of the images in the menu screen, as shown in, FIG. 6, for instance.

In step S21, the MPU 21 makes a decision as to whether or not the number of thumbnail images displayed in the menu screen has reached the maximum value. If it is decided that the number of the thumbnail images in the menu screen has not reached the maximum value yet, the MPU 21 makes a decision in step S22 as to whether or not the thumbnail image data stored in the main storage memory 22 include any thumbnail image data that have not been selected yet. If it is decided that there are unselected thumbnail image data, the operation returns to step S19, and the processing in steps S19 through S21 is executed repeatedly until it is decided that there are no thumbnail image data left unselected in the thumbnail image data stored in the main storage memory 22.

If it is decided in step S21 that the number of the thumbnail images in the menu screen has reached the maximum value or if it is decided in step S22 that there are no more unselected thumbnail image data (all the thumbnail image data have been selected), the operation proceeds to step S23 in FIG. 4. At this time, all the thumbnail images stored in the main storage memory 22 are displayed in the menu screen at the LCD 4, or the maximum number of thumbnail images A through I (9 thumbnail images in the example presented in figure six) that can be displayed at the LCD 4 are displayed in the menu screen at the LCD 4, as shown in FIG. 6, for instance.

In step S23, the MPU 21 makes a decision as to whether or not the scroll key 6 has been operated. If it is decided that the scroll key 6 has been operated, the MPU 21 makes a decision in step S24 as to whether or not the thumbnail image data stored in the main storage memory 22 include any thumbnail image that has not yet been displayed in the menu screen. If it is decided that there is a thumbnail image that has not yet been displayed in the menu screen, the operation returns to step S19, and the processing in steps S19 through S24 is executed repeatedly until there is no more thumbnail images that have not been displayed in the menu screen among the thumbnail images stored in the main storage memory 22, as explained earlier. Thus, if the scroll key 6 has been operated by the user, the thumbnail images stored in the main storage memory 22 are sequentially displayed in the menu screen.

If it is decided in step S23 that the scroll key 6 has not been operated or if it is decided in step S24 that there is no thumbnail image that has not been displayed in the menu screen, the operation proceeds to step S25.

In step S25, the MPU 21 makes a decision as to whether or not a thumbnail image displayed in the menu screen has been selected via the touch panel 5. If it is decided that no thumbnail image has been selected, a decision is made in step S26 as to whether or not the menu display button 7 has been turned on, and if it is decided that the shutter release button 7 has not been turned on, the operation returns to step S23 to repeat the subsequent processing. If it is decided, on the other hand, that the shutter release button 7 has been turned on, the menu screen is cleared in step S34. Then, the operation returns to step S11 to execute the subsequent processing.

If it is decided in step S25 that a thumbnail image displayed in the menu screen has been selected through an operation of the touch panel 5 performed by the user, the MPU 21 makes a decision in step S27 as to whether or not the exclusive output mode (the independent output mode) is set. The MPU 21 sets the exclusive output mode if the mode selector button 8 is operated in a mode other than the exclusive output mode, and clears the exclusive output mode if the mode selector button 8 is operated in the exclusive output mode. If the exclusive output mode is set, the image data are output only to the output terminal 30 (to the video monitor 40) and no image data are output to the LCD 4. If, on the other hand, the exclusive output mode is not set, the image data are output to both the LCD 4 and the output terminal 30 (to the video monitor 40). Accordingly, if it is decided in step S27 that the exclusive output mode is currently set, the MPU 21 outputs the dynamic image corresponding to the selected thumbnail image to the video monitor 40 via the output terminal 30 in step S28.

In other words, a signal indicating that a thumbnail image has been selected on the menu screen at the LCD 4 is output to the MPU 21 through the touch panel 5 (an input unit 31). At this time, the MPU 21 implements control on the recording/reproduction unit 25 via the internal bus 51 to have the dynamic image data corresponding to the selected thumbnail image read out from the optical disk 26 and provide the dynamic image data to the image decoder 27 via the internal bus 51. The image decoder 27 decodes the dynamic image data thus provided and outputs the decoded data to the image controller 28. The image controller 28, which is controlled by the MPU 21, outputs the supplied dynamic image data to the D/A conversion unit 29 without outputting them to the LCD 4. The D/A conversion unit 29 converts the digital dynamic image data that have been provided to analog data and outputs the converted data to the video monitor 40 via the output terminal 30. As a result, the dynamic image having been selected on the menu screen is displayed at the video monitor 40. For instance, if the thumbnail image B has been selected, the dynamic image B' that corresponds to the supplied thumbnail image B is displayed at the video monitor 40, as shown in FIG. 7. At this time, the LCD 4 sustains the menu screen display.

In step S29, the MPU 21 makes a decision as to whether or not a thumbnail image has been selected on the LCD 4 while reproducing the dynamic image at the video monitor 40. If it is decided that a thumbnail image has been selected on the LCD 4 while reproducing the dynamic image at the video monitor 40, the MPU 21 stores the ID (the identification code) of the selected thumbnail image in correspondence to the order in which it has been selected in step S30, before the operation proceeds to step S31.

In other words, a signal that indicates that a specific thumbnail image has been selected on the menu screen at the LCD 4 is output through the touch panel 5 (the input unit 31) to the MPU 21 via the internal bus 51. The MPU 21 stores the ID of the dynamic image data corresponding to the signal thus provided in the main storage memory 22 in correspondence to the order of selection. If it is decided in step S29 that a thumbnail image has been selected, the processing in step S30 is skipped.

In step S31, the MPU 21 makes a decision as to whether or not the reproduction of the dynamic image currently on display at the video monitor 40 has been completed. If it is decided that the reproduction of the dynamic image has not been completed yet, the operation returns to step S29 and the processing in steps S29 through S31 is executed repeatedly until the reproduction of the dynamic image is completed.

Once the reproduction of the dynamic image is completed, the operation proceeds to step S32 in which the MPU 21 deletes the ID of the dynamic image, the reproduction of which has been completed, from the main storage memory 22. In step S33, the MPU 21 makes a decision as to whether or not there is any dynamic image data ID still stored in the main storage memory 22. If it is decided that there is an ID still stored in the main storage memory 22, the operation returns to step S28 to execute the processing in steps S28 through S32 on the next stored thumbnail image as the selected thumbnail image. Thus, dynamic images corresponding to the thumbnail images are reproduced and displayed at 40 sequentially in the order of their IDs stored in the main storage memory 22. For instance, if the thumbnail images are selected in the order of B, D, E and G as shown in FIG. 8, dynamic images are sequentially reproduced and displayed at the video monitor 40 in the order of B', D', E', and F' in conformance to the order of their selection.

If it is decided in step S33 that no dynamic image data ID is stored in the memory, the operation returns to step S23, and the processing in steps S23 through S33 is executed as explained earlier.

If the MPU decides in step S27 that the exclusive output mode is not currently set, the dynamic image corresponding to the selected thumbnail image is output to and displayed at both the video monitor 40 and the LCD 4 in step S35 in FIG. 5.

Figure 9:
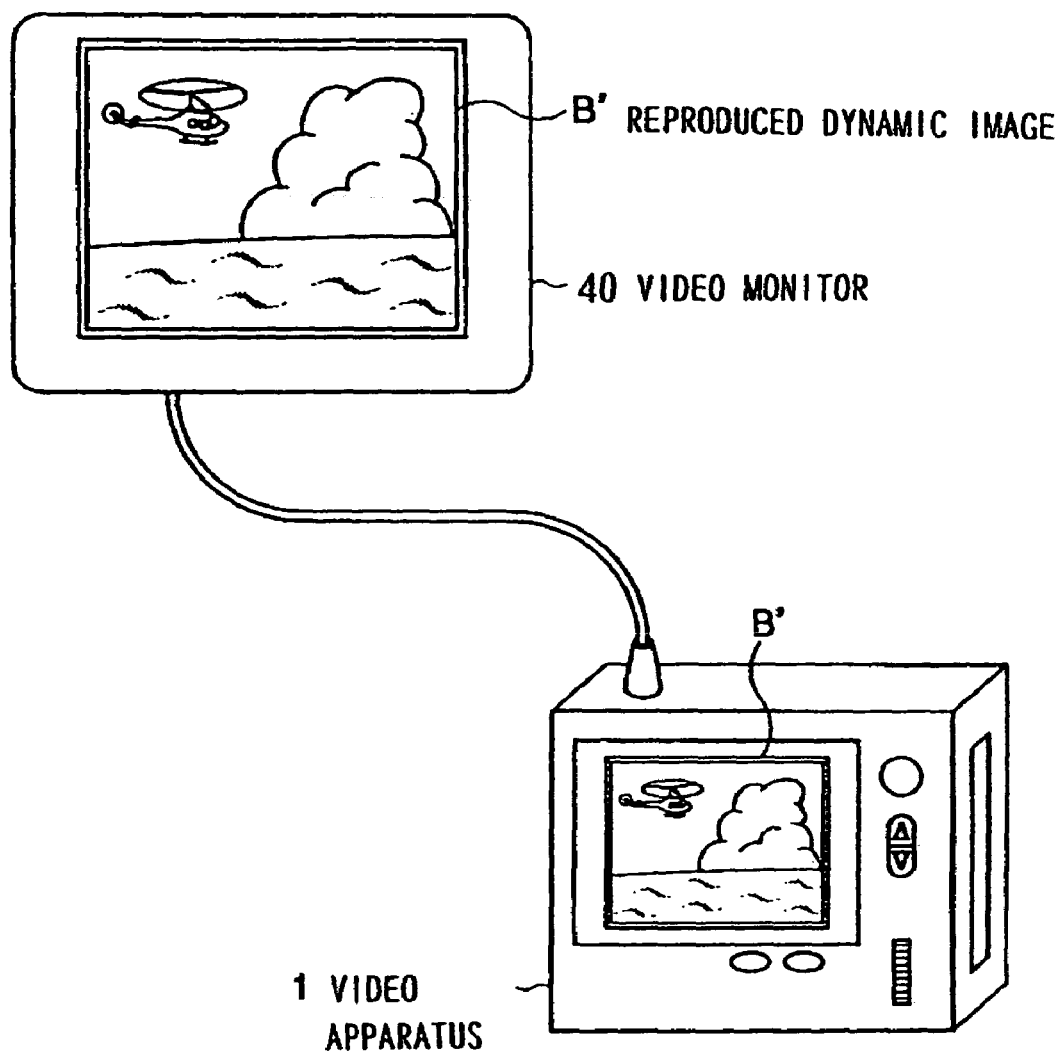
FIG. 9 illustrates the prior art.

Namely, a signal that indicates that a thumbnail image has been selected on the menu screen of the LCD 4 is output to the MPU 21 through the touch panel 5 (the input unit 31). The MPU 21 implements control on the recording/reproduction unit 25 to have the dynamic image corresponding to the signal thus provided read out from the optical disk 26 and output the dynamic image data thus read out to the image decoder 27 via the internal bus 51. The image decoder 27 decodes the dynamic image data thus provided and outputs the decoded data to the image controller 28. The MPU 21 implements control on the image controller 28 to have the dynamic image data that have been provided to the image controller 28 output to the D/A conversion unit 29 and also to the LCD 4. The D/A conversion unit 29 converts the digital dynamic image data that have been provided to analog data and outputs the converted data to the video monitor 40 via the output terminal 30. As a result, the dynamic image corresponding to the thumbnail image selected by the user is displayed at the video monitor 40 and, in addition, the dynamic image that has been provided is displayed at the LCD 4 instead of the menu screen that has been on display, as well. For instance, if the thumbnail image B is selected, the dynamic image B' is displayed both at the video monitor 40 and the LCD 4, as shown in FIG. 9.

Next, in step S36, the MPU, 21 waits for the reproduction of the dynamic image to be completed, and once the reproduction of the dynamic image is completed, the MPU 21 brings back the menu screen on display at the LCD 4 in step S37, before the operation returns to step S23 to execute the subsequent processing.

As explained above, in the video apparatus 1 in FIG. 1, since the dynamic image provided to the image controller 28 is not output to the LCD 4 while the dynamic image data are being output to the video monitor 40 in the exclusive output mode, the video apparatus enables verification of a list of dynamic images that can be displayed at the video monitor 40, selection of the dynamic image to be displayed at the video monitor 40 and selection of specification for a dynamic image to be displayed while a dynamic image is being reproduced and displayed at the video monitor 40.

While a plurality of thumbnail images (the menu screen) or a dynamic image is selectively displayed at the LCD 4 in the example explained above, the dynamic image currently on display at the video monitor 40 may be displayed in addition to the menu screen, as shown in FIG. 10A, to enable the user to check the dynamic image on display at the video monitor 40 at all times.

In addition to the plurality of thumbnail images, the dynamic image currently captured at the image-capturing unit 23 may be displayed at the LCD 4, as shown in FIG. 10B, to enable the user to check the dynamic image currently captured at the image-capturing unit 23.

Furthermore, in addition to the plurality of thumbnail images, the dynamic image currently reproduced at the video monitor 40 and the dynamic image currently captured at the image-capturing unit 23 may be displayed at the LCD 4, as shown in FIG. 10C, to enable the user to verify both the dynamic image currently on display at the video monitor 40 and the dynamic image currently captured at the image-capturing unit 23.

Moreover, as illustrated in FIG. 11A, images of letters (characters that enable identification of the corresponding dynamic images) that represent characteristics of dynamic images recorded in the optical disk 26 may be displayed in place of thumbnail images. In addition, in combination with letters representing the characteristics of the dynamic images, the dynamic image currently displayed at the video monitor 40 maybe displayed as illustrated in FIG. 11B, the dynamic image currently captured at the image-capturing unit 23 may be displayed as illustrated in FIG. 11C or both the dynamic image currently displayed at the video monitor 40 and the dynamic image currently captured at the image-capturing unit 23 may be displayed, as illustrated in FIG. 11D.

It is to be noted that the variation explained earlier in reference to the first embodiment may be adopted in a similar manner in the second embodiment.

What is claimed is:

1. An image processing apparatus that reads out and outputs image information recorded in a recording medium, comprising:
   a read device that reads out a plurality of sets of image information recorded in the recording medium;
   a display device that displays image information read out by said read device;
   a list display device that displays a list of a plurality of sets of image information read out by said read device;
   a selection device that selects any image information from the list of the plurality of sets of image information displayed at said list display device;
   an output device that outputs image information selected by said selection device to outside of said image processing apparatus; and
   a display control device that simultaneously displays the list of the plurality of sets of image information to said display device by said list display device and outputs the selected image information by said output device.

2. An image processing apparatus according to claim 1, further comprising:
an image-capturing device that captures an image of a subject; and
a recording device that records image information with respect to the image captured by said image-capturing device in the recording medium.

3. An image processing apparatus according to claim 2, further comprising:
a switching device that selects either the image information with respect to the image captured by said image-capturing device or the image information read out from the recording medium for display at said display device.

4. An image processing apparatus according to claim 1, wherein:
the image information recorded in the recording medium is dynamic image information; and
a generating device that generates still image information to be displayed at said display device based upon the dynamic image information recorded in the recording medium is provided.

5. An image processing apparatus according to claim 1, wherein:
the image information output by said output device is dynamic image information; and
said display device displays the dynamic image information currently output by said output device.

6. An image processing method employed in an image processing apparatus that reads out and outputs image information recorded in an image information recording medium, comprising:
a read out step in which a plurality of sets of image information recorded in said image information recording medium are read out;
a display step in which the image information read out in said read out step is displayed;
a list display step in which a list of a plurality of sets of image information read out in said read out step is displayed;
a selection step in which any image information is selected from the list of the plurality of sets of image information displayed in said list display step;
an output step in which the image information selected in said selection step is outputted to outside of the image processing apparatus; and
a display control step in which simultaneously the list of the plurality of sets of image information in said list display step is displayed and an output of the selected image information in said output step is outputted.

7. A recording medium having recorded therein a program used in an image processing apparatus that reads out and outputs image information recorded in an image information recording medium, said program comprising:
a read out step in which a plurality of sets of image information recorded in said image information recording medium are read out;
a display step in which the image information read out in said read out step is displayed;
a list display step in which a list of a plurality of sets of image information read out in said read out step is displayed;
a selection step in which any image information is selected from the list of the plurality of sets of image information displayed in said list display step;
an output step in which the image information selected in said selection step is outputted to outside of the image processing apparatus; and
a display control step in which simultaneously the list of the plurality of sets of image information in said list display step is displayed and an output of the selected image information in said output step is outputted.

8. A data signal embodied in a carrier wave comprising a program used in an image processing apparatus that reads out and outputs image information recorded in an image information recording medium, said program comprising:
a read out step in which a plurality of sets of image information recorded in said image information recording medium are read out;
a display step in which the image information read out in said read out step is displayed;
a list display step in which a list of a plurality of sets of image information read out in said read out step is displayed;
a selection step in which any given set of image information is selected from the image information displayed in said display step;
an output step in which the image information selected in said selection step is outputted to outside of the image processing apparatus; and
a display control step in which simultaneously the list of the plurality of sets of image information in said list display step is displayed and an output of the selected image information in said output step is outputted.

9. An image processing apparatus that reads out and outputs image information recorded in a recording medium, comprising:
a read device that reads out a plurality of sets of image information recorded in the recording medium;
a display device that displays image information read out by said read device;
an output device that outputs image information read out by said read device to outside of the image processing apparatus; and
a display control device that can switch a first display mode, in which the same image information is simultaneously supplied to said display device and said output device, with a second display mode, in which different image information is simultaneously supplied to said display device and said output device.

* * * * *